(12) United States Patent
Malik (10) Patent No.: US 11,197,159 B2
(45) Date of Patent: Dec. 7, 2021

(54) REDUCING LATENCY ASSOCIATED WITH THREAT DETECTION

(71) Applicant: T-Mobile USA, Inc., Bellevue, WA (US)

(72) Inventor: Sireen Malik, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 451 days.

(21) Appl. No.: 16/351,278

(22) Filed: Mar. 12, 2019

(65) Prior Publication Data

US 2020/0296589 A1 Sep. 17, 2020

(51) Int. Cl.
*G06F 21/00* (2013.01)
*H04W 12/121* (2021.01)
*H04W 28/02* (2009.01)
*H04L 29/06* (2006.01)
*H04W 84/04* (2009.01)

(52) U.S. Cl.
CPC ........... *H04W 12/121* (2021.01); *H04L 63/20* (2013.01); *H04W 28/0231* (2013.01); *H04W 84/042* (2013.01)

(58) Field of Classification Search
CPC ......... G06F 21/00; G06F 21/50; H04L 63/00; H04L 63/02; H04L 63/14; H04L 63/20; H04W 84/042; H04W 28/0231; H04W 12/121

USPC .......................................................... 726/23
See application file for complete search history.

(56) References Cited

U.S. PATENT DOCUMENTS

| | | | |
|---|---|---|---|
| 7,409,715 B2 * | 8/2008 | Gariador | H04L 63/1466 726/23 |
| 9,363,281 B1 * | 6/2016 | Allen | H04L 63/1408 |
| 2017/0230873 A1 * | 8/2017 | Baek | H04W 36/0011 |
| 2018/0316799 A1 * | 11/2018 | Shaw | H04L 41/0806 |
| 2020/0020136 A1 * | 1/2020 | Hwang | G06F 40/109 |
| 2020/0045079 A1 * | 2/2020 | Dods | H04L 63/083 |
| 2020/0187301 A1 * | 6/2020 | Park | H04W 48/18 |

* cited by examiner

*Primary Examiner* — Josnel Jeudy
(74) *Attorney, Agent, or Firm* — Lee & Hayes, P.C.

(57) ABSTRACT

Latency can be reduced within a network associated with a wireless service provider when detecting threats to the network. Instead of detecting threats before delivering data, data can be delivered to a computing device while threats to the network are detected. When data is received, as received data, at the network, a copy of the data can be provided to a threat detection component, while the received data can further be provided to the target computing device based on the current policies. The time it takes the threat detection component to examine the data and detect a possible threat to the mobile network does not impact the delivery of the data. Instead, the received data is provided to the target computing device while the threat detection component examines the data to identify any possible threats. The threat detection component signals a node within the network when a threat is detected.

20 Claims, 4 Drawing Sheets

REDUCING LATENCY ASSOCIATED WITH THREAT DETECTION

BACKGROUND

Mobile networks are expanding rapidly. For example, not only are 4G-LTE networks expanding, wireless service providers are starting to deploy 5G networks. As these networks expand to provide more bandwidth along with lower latency, protecting these networks against security threats becomes even more challenging. For example, protecting a network from a distributed denial-of-service (DDoS) volume attack, or some other type of attack, can be more difficult for high bandwidth networks. Adding to this challenge is the fact that detecting these network threats can introduce latency in providing data to computing devices in the network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Described herein are techniques and systems for reducing latency associated with threat detection. Using techniques described herein, latency can be reduced within a network, such as a 5G network, associated with a wireless service provider by performing threat detection independently from the delivery of the data to a target computing device. Instead of detecting threats and then delivering data to a computing device, data can be delivered to a receiving computing device while threats to the network are detected.

When data is received at the network, a copy of the data is provided to a threat detection component for threat detection. The received data is provided to the target computing device based on the policies currently in place regarding the sending computing device and/or the target computing device. The time it takes the threat detection component to examine the data and detect a possible threat to the mobile network does not impact the delivery of the data to the target computing device. Instead, the data received at the network can be provided to the target computing device while the threat detection component examines the data to identify any possible threats.

In some configurations, the threat detection component signals a computing device when a threat or possible threat is detected or performs some other action. For example, when a possible threat is detected, the threat detection component may instruct a computing device to hold data to be sent until the threat detection component has completed further threat-detection analysis. In other configurations, the threat detection component can notify the target computing device that a possible threat is detected. In some instances, after further analysis, the threat detection component may determine that an actual threat exists, whereas in other instances, the threat detection component may determine that no threat exists. When no actual threat is detected, the threat detection component may instruct the sending computing device (or some other computing device) to release any data that has been held. In other examples, the threat detection signals a node within the mobile network to assist in determining an action to perform as a result of the detected threat.

According to some configurations, the threat detection component notifies a Policy and Charging Rules Function (PCRF) node. The PCRF can be a software component and/or a hardware component that operates at the network core. The PCRF node, based on the policy rules associated with the network, determines what threat detection action to perform. For example, a connection associated with the computing device sending such data can be pre-empted (e.g., disconnected), the data transmission rates can be adjusted (e.g., lowered), or some other threat detection action can be determined in an attempt to mitigate the detected security threat. In some examples, the PCRF node signals the gateway node to implement the determined threat detection action. Generally, the gateway node connects is configured to connect computing devices to a mobile network. More details are provided below with regard to FIGS. 1-4.

Figure 1:
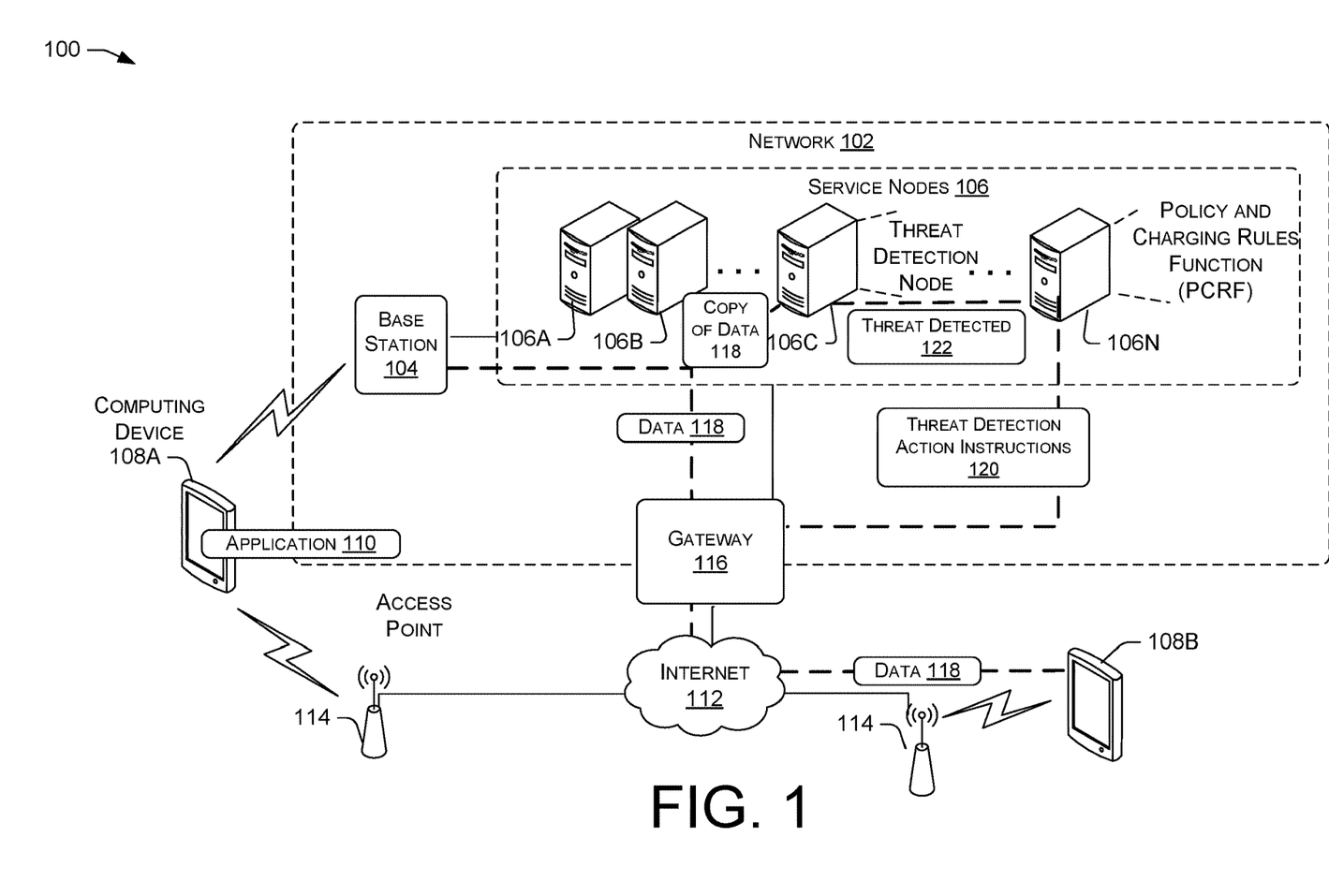
FIG. 1 is a block diagram showing an illustrative environment for reducing latency associated with threat detection in a mobile network.

FIG. 1 is a block diagram showing an illustrative environment 100 for reducing latency associated with threat detection in a mobile network. The environment 100 may include a network 102 that is operated by a wireless service provider. The environment 100 is illustrated in simplified form and may include many more components.

The network 102 may include one or more base stations 104 and one or more service nodes 106. A base station 104 may handle traffic and signals between electronic devices, such as the computing devices 108A and 108B, and a core network of the network 102. For example, the base station 104 may perform the transcoding of speech channels, allocation of radio channels to electronic devices, paging, transmission and reception of voice and data, as well as other functions. The base station 104 may include several base transceiver stations (BTS), each BTS may include a transceiver, antenna, and additional network switch and control equipment that provide a network cell for facilitating wireless communication between computing devices and the core network of the network 102. In some instances, the base station 104 may include an eNodeB and/or a gNodeB.

The core network may be responsible for routing voice communication to other networks, as well as routing data communication to external packet switched networks, such as the Internet. For example, the one or more service nodes 106 may be a Gateway GPRS Support Node (GGSN) or another equivalent node. According to some configurations, the one or more service nodes also include a Policy and Charging Rules Function (PCRF) node that utilized to enforce policy rules of the network.

The PCRF node can be configured to automatically make policy decisions for each subscriber (e.g., each user equipment (UE)) active on the network. For example, the PCRF may be utilized to allocate bandwidth of the network as well as provide different levels of service to different computing devices on the network. Additionally, some data can be prioritized within the network.

The computing devices 108A and 108B may be a smart phone, a personal digital assistant, a netbook, a laptop computer, and/or another electronic that is capable of sending and/or receiving voice or data via the network 102 and/or a Wi-Fi network. In some instances, the computing devices 108A and 108B can be configured to send and receive data using any wired or wireless protocols.

In some configurations, one or more of the service nodes 106 may be configured as one or more application servers that provide support for one more applications, such as application 110. Some example applications include, but are not limited to browser applications, messaging applications, voice applications (e.g., Voice over Internet Protocol "VoIP" applications), video applications, and the like. While the service nodes 106 are illustrated within the network 102, one or more other computing devices may be located outside of the network 102. For example, an application server, or some other server or device, may be connected to the network 102 via one or more external packet switched networks, such as the Internet.

According to some configurations, a telephony client application, such as application 110, on the computing device 108 may establish data communication with the network 102 through a data connection to the base station 104. The base station 104 may route a communication from the communication device 108 through the core network via the service nodes 106. In such instances, the service nodes 106 may be capable of performing subscriber profile insertion with respect to data traffic between the application 110 on the computing device 108 and the application server. For example, the application 110 may be an application that sends data to another computing device.

When a communication request arrives at the network 102, one or more of the service nodes 106 may determine the identity of the originating computing device for the communication (e.g., using a telephone number, IMEI, IMSI, IP address) as well as the identity of the computing devices to send the communication. According to some configurations, the application 110 on the computing device 108 may connect to the service nodes 106, or some other component such as an application server, via the Internet 112. In such instances, the application 110 may connect to the Internet 112 via Wi-Fi access point 114A. Accordingly, data traffic from the application 110 may be routed to the service nodes 106 by the gateway 116 of the network 102.

In either case, the computing device 108, such as the computing device 108A, requests to make a communication with a destination number associated with one or more computing devices. The network 102 receives the request and, in some cases, may authenticate the user and/or the computing device. For example, the service nodes 106 may authenticate the computing device 108. In some cases, the service nodes 106 may query a database, or some other data store or memory, to determine the originating number and the computing devices associated with the requested destination number.

In some configurations, the PCRF node 106N is configured to receive data from another computing device, such as threat detection node 106C that is operable detect threats to the network. Generally, the threat detection node 106C can be configured to detect any type of threat or attack, such as but not limited to DDoS attacks, phishing attacks, virus threats, malware threats or some other type of threats or attacks. For example, a threat detection component associated with the node 106C may identify a possible threat to the network based on a copy of the data 118' and notify the PCRF node 106N of the threat. In other examples, the node 106C can notify other computing devices of the threat. For instance, the node 106C can notify the computing device 108B of the threat, and/or some other computing device (e.g., one or more of the nodes 106).

Using the technologies described herein, latency can be reduced when detecting threats to the network 102. Instead of detecting threats (e.g., using functionality at the gateway 116) before delivering data 118, the data 118 can be delivered to computing device 108B while a copy of the data 118' is examined by the threat detection node 106C for possible threats to the network are detected.

As illustrated, the threat detection is performed on the copy of the data 118' (after the data has passed through gateway 116) as the data 118 is provided to the computing device 108B. As such, the time it takes the threat detection component to examine the data and detect a possible threat to the mobile network does not impact the delivery of the data 118 to the target computing device. Instead of examining the data at the gateway 116 before the data 118 is provided to a computing device, the data 118 received at the network can be provided to the target computing device 108B while the threat detection component examines the copy of the data 118' to identify any possible threats.

In some configurations, a determination can be made as to whether to perform the threat detection using a copy of the data 118' or using the data 118 itself. For example, when a 5G network is being utilized, the threat detection component can examine a copy of the data 118' while the data 118 is delivered to the computing device 108B. In this way, the time it takes to detect a possible threat does not impact the time it takes to deliver the data 118 to the computing device 108B. In other examples, the threat detection can be performed by the threat detection component using the data 118 (instead of a copy of the data 118'), when a slower network is being utilized (e.g., 3G). According to some configurations, an authorized user (e.g., an administrator) may specify the networks (e.g., 3G, 4G, 5G, . . . ) when the threat detection component detects possible threats using a copy of the data 118' (while the data 118 is delivered to the computing device 108B), and when the threat detection component detects possible threats using the data 118 which delays the delivery of the data 118 to the computing device 108B. In this way, the wireless service provider can reduce latency for high speed networks by performing threat detection independently from the delivery of the data 118 while still performing threat detection before delivering the data 118 on slower speed networks in which latency is not as much an issue.

In some examples, the threat detection component within the threat detection node 106C signals a computing device when a threat or possible threat is detected or performs some other action. For example, when a possible threat is detected, the threat detection node 106C may data received from the sending computing device 108A to be held after the possible threat has been detected, until the threat detection node 106C has completed further threat-detection analysis. In some instances, after further analysis, the threat detection node 106C may determine that an actual threat exists, whereas in other instances, the threat detection node 106C may determine that no threat exists. When no actual threat is detected, the threat detection node 106C may instruct a computing device (such as the sending computing device 108A or a node 106) to release the held data. In other examples, the threat detection node 106C signals a node within the network to determine an action to perform based on the detected threat.

According to some configurations, the threat detection node 106C notifies a Policy and Charging Rules Function (PCRF) node 106N, The PCRF node can be a software component and/or a hardware component that operates within network 102, such as within the network core. The PCRF node 106N, based on the policy rules associated with the network, determines what threat detection action to perform. For example, polices accessed by the PCRF node 106N may indicate that the connection with the sending computing device 108A is to be pre-empted, the data rates adjusted (e.g., lowered), the sending computing device 108A can be identified as a possible threat (e.g., a "suspicious" device), the sending computing device 108A quarantined such that the device can not send data to other devices within the network, or some other threat detection action is determined in an attempt to mitigate the detected security threat. For example, the data sent by the computing device 108A after a possible threat is detected may be held until a determination is made that the computing device 108A does not pose a threat. In some examples, the threat detection node 106C, or some other node, may provide an indication to the target computing device 108B that the data 118 sent to the target computing device 108B may be a possible threat. In this way, the target computing device 108B may determine how to process the received data. If it is determined that the computing device 108A poses an actual threat, one or more other actions may be taken (e.g., as indicated above).

In some examples, the PCRF node 106N signals the gateway 116 to implement the determined threat detection action. When other data is received at the network 102 from the computing device 108A, the gateway 116 can continue to apply the existing policy based on the previous data. For example, if the PCRF node 106N instructs the gateway to prevent data from being delivered to a computing device, such as computing device 108B, the gateway 116 prevents data received subsequent to the data 118 from being delivered. More details are provided below.

Figure 2:
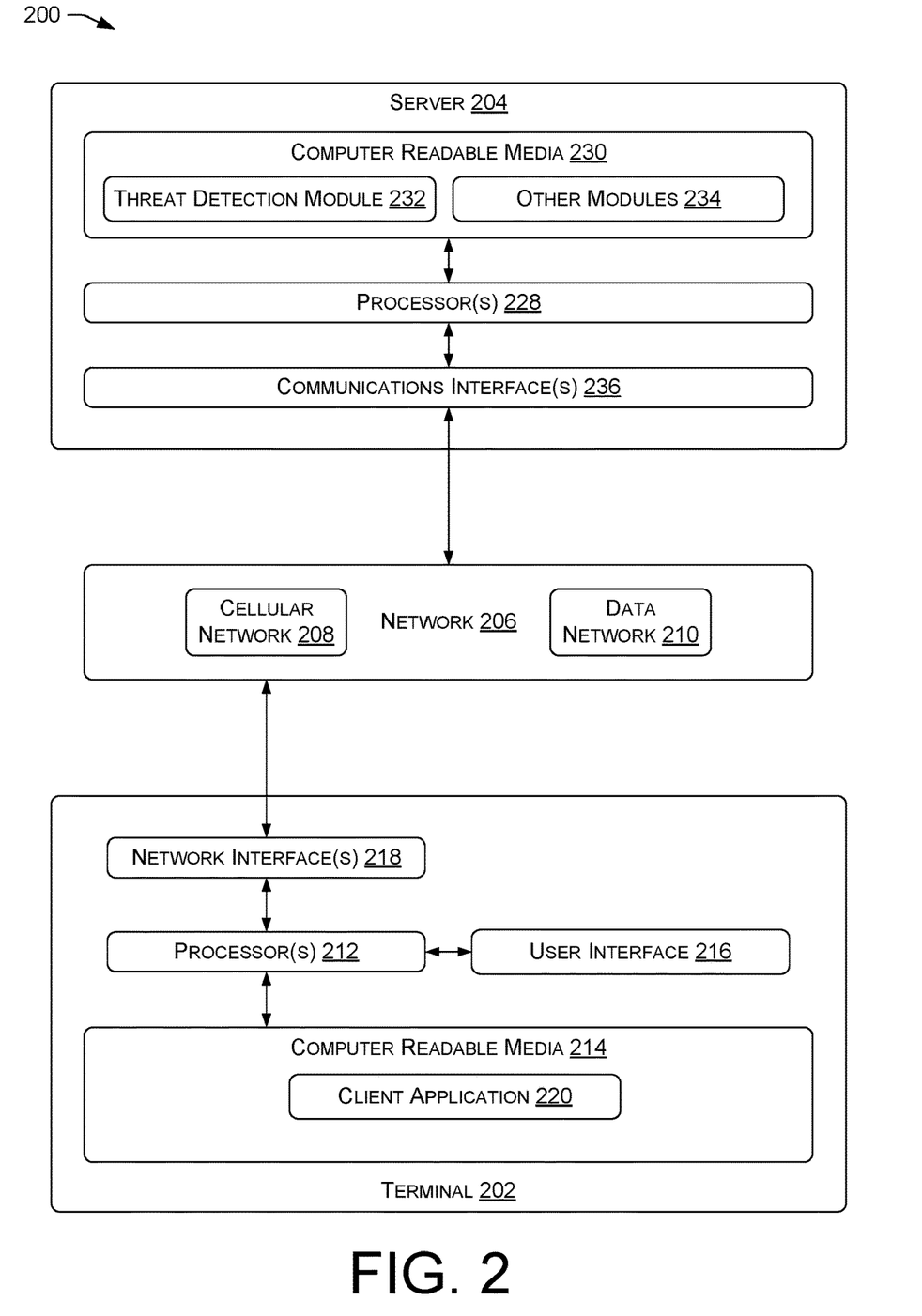
FIG. 2 is a block diagram illustrating a system that includes a threat detection component for detecting security threats to a mobile network.

FIG. 2 is a block diagram illustrating a system 200 that includes a threat detection component 232 for detecting security threats to a mobile network according to some implementations. The system 200 includes a terminal 202, which can represent computing device 108A or 108B of FIG. 1, coupled to a server 204, via a network 206. The server 204 can represent one or more of the service nodes 106. The network 206 can represent, e.g., networks 102 or 112, or other networks of environment 100.

The network 206 can include one or more networks, such as a cellular network 208 and a data network 210. The network 206 can include one or more core network(s) connected to terminal(s) via one or more access network(s). Example access networks include LTE, WIFI, GSM Enhanced Data Rates for GSM Evolution (EDGE) Radio Access Network (GERAN), UTRAN, and other cellular access networks. Message transmission, reception, fallback, and deduplication as described herein can be performed, e.g., via 3G, 4G, 5G, WIFI, or other networks.

The cellular network 208 can provide wide-area wireless coverage using a technology such as GSM, Code Division Multiple Access (CDMA), UMTS, LTE, or the like. Example networks include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), GPRS, EDGE, Advanced Mobile Phone System (AMPS), High Speed Packet Access (HSPA), evolved HSPA (HSPA+), VoIP, VoLTE, IEEE 802.1x protocols, wireless microwave access (WIMAX), WIFI, and/or any future IP-based network technology or evolution of an existing IP-based network technology. Communications between the server 204 and terminals such as the terminal 202 can additionally or alternatively be performed using other technologies, such as wired (Plain Old Telephone Service, POTS, or PSTN lines), optical (e.g., Synchronous Optical NETwork, SONET) technologies, and the like.

The data network 210 can include various types of networks for transmitting and receiving data (e.g., data packets), including networks using technologies such as WIFI, IEEE 802.15.1 ("BLUETOOTH"), Asynchronous Transfer Mode (ATM), WIMAX, and other network technologies, e.g., configured to transport IP packets. In some examples, the server 204 includes or is communicatively connected with an IWF or other device bridging networks, e.g., LTE, 3G, and POTS networks. In some examples, the server 204 can bridge SS7 traffic from the PSTN into the network 206, e.g., permitting PSTN customers to place calls to cellular customers and vice versa.

In some examples, the cellular network 208 and the data network 210 can carry voice or data. For example, the data network 210 can carry voice traffic using VoIP or other technologies as well as data traffic, or the cellular network 208 can carry data packets using HSPA, LTE, or other technologies as well as voice traffic. Some cellular networks 208 carry both data and voice in a packet-switch (PS) format. For example, many LTE networks carry voice traffic in data packets according to the VoLTE standard. Various examples herein provide origination and termination of, e.g., carrier-grade voice calls on, e.g., networks 206 using circuit-switching (CS) transports or mixed VoLTE/3G transports, or on terminals 202 including OEM handsets and non-OEM handsets.

The terminal 202 can be or include a wireless phone, a wired phone, a tablet computer, a laptop computer, a wristwatch, or other type of terminal. The terminal 202 can include one or more processors 212, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media (CRM) 214, such as memory (e.g., random access memory (RAM), solid state drives (SSDs), or the like), disk drives (e.g., platter-based hard drives), another type of computer-readable media, or any combination thereof. The CRM or other memory of terminal 202 can hold a datastore, e.g., an SQL or NoSQL database, a graph database, a BLOB, or another collection of data. The terminal 202 can further include a user interface (UI) 216, e.g., including an electronic display device, a speaker, a vibration unit, a touchscreen, or other devices for presenting information to a user and receiving commands from the user. The terminal 202 can further include one or more network interface(s) 218 configured to selectively communicate (wired or wirelessly) via the network 206, e.g., via an access network 112 or 208, 210.

The CRM 214 can be used to store data and to store instructions that are executable by the processors 212 to perform various functions as described herein. The CRM 214 can store various types of instructions and data, such as an operating system, device drivers, etc. The processor-executable instructions can be executed by the processors 212 to perform the various functions described herein.

The CRM 214 can be or include computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, non-transitory medium which can be used to store the desired information and which can be accessed by the processors 212. Tangible computer-readable media can include volatile and nonvolatile, removable and non-removable media implemented in any method or technology for storage of information, such as computer readable instructions, data structures, program components, or other data.

The CRM 214 can include processor-executable instructions of a client application 220. The client application 220, e.g., a native or other dialer, can permit a user to originate and terminate communication sessions associated with the terminal 202, e.g., a wireless phone. The client application 220 can additionally or alternatively include an SMS, RCS, or presence client, or a client of another telephony service offered by the server 204.

The CRM 214 can store information 222 identifying the terminal 202. The information 222 can include, e.g., an IMEI, an IMSI identifying the subscriber using terminal 202, or other information discussed above. The CRM 214 can additionally or alternatively store credentials (omitted for brevity) used for access, e.g., to IMS or RCS services.

The server 204 can include one or more processors 228 and one or more CRM 230. The CRM 230 can be used to store processor-executable instructions of a threat detection component 232, as well as one or more other components 234. In some configurations, the server 204 can be configured as a PCRF service node 106N, a threat detection node 106C, and the like. The processor-executable instructions can be executed by the one or more processors 228 to perform various functions described herein, e.g., with reference to FIGS. 1 and 3-4.

In some examples, server 204 can communicate with (e.g., is communicatively connectable with) terminal 202 or other devices via one or more communications interface(s) 236, e.g., network transceivers for wired or wireless networks, or memory interfaces. Example communications interface(s) 236 can include ETHERNET or FIBRE CHANNEL transceivers, WIFI radios, or DDR memory-bus controllers (e.g., for DMA transfers to a network card installed in a physical server 204).

In some examples, processor 212 and, if required, CRM 214, are referred to for brevity herein as a "control unit." For example, a control unit can include a CPU or DSP and instructions executable by that CPU or DSP to cause that CPU or DSP to perform functions described herein. Additionally, or alternatively, a control unit can include an ASIC, FPGA, or other logic device(s) wired (physically or via blown fuses or logic-cell configuration data) to perform functions described herein. Other examples of control units can include processor 228 and, if required, CRM 230.

Figure 3:
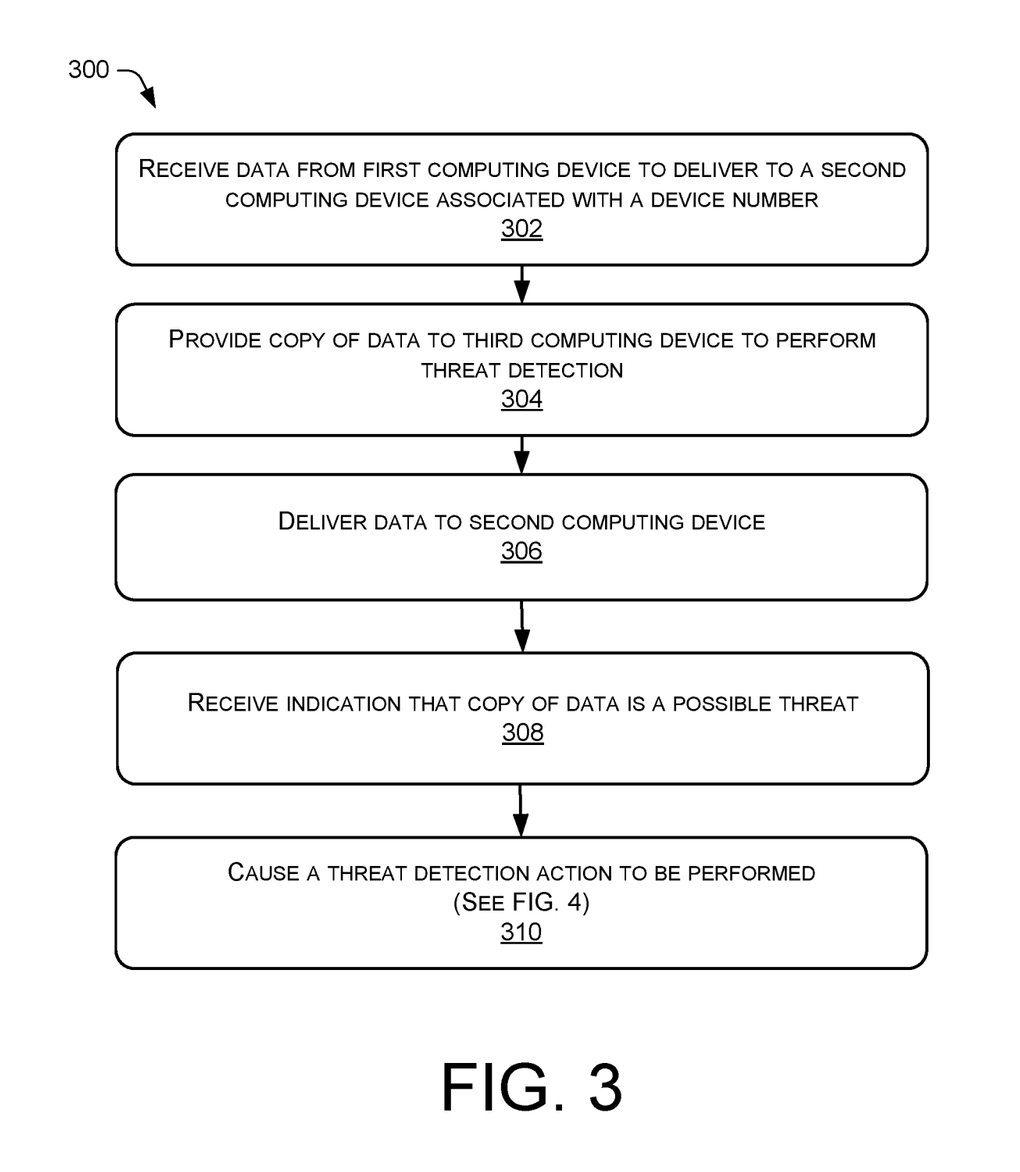
FIG. 3 is a flow diagram of an example process that includes reducing the latency associated with threat detection in a mobile network according to some implementations.
Figure 4:
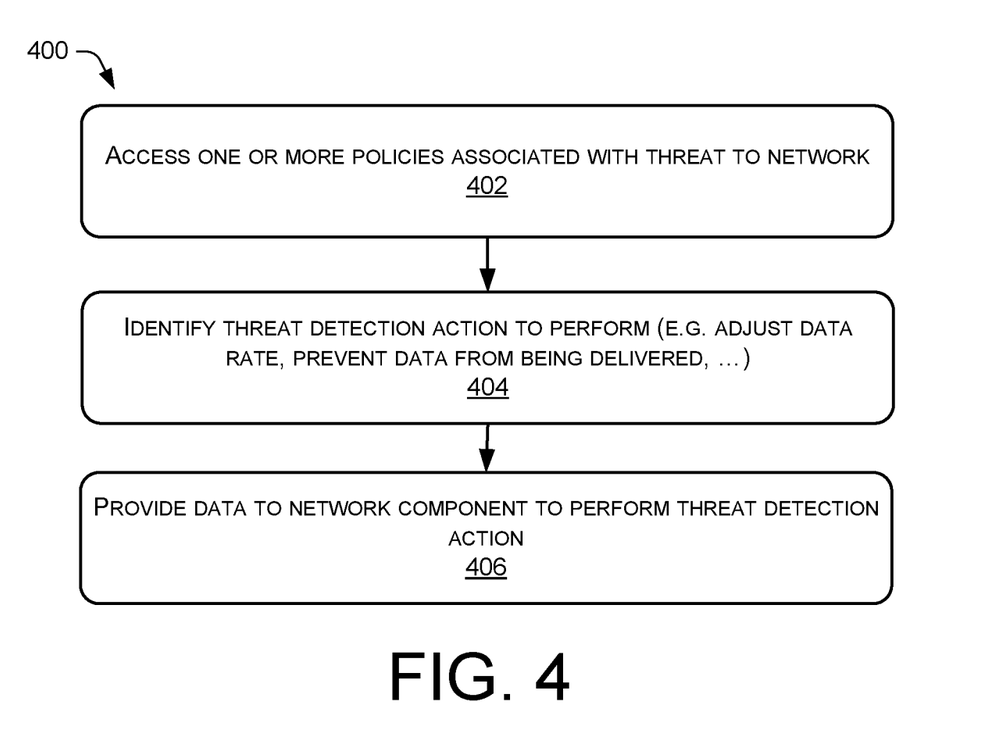
FIG. 4 is a flow diagram of an example process that includes causing a threat detection action to be performed in response to detecting a threat.

In the flow diagrams of FIGS. 3 and 4, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300 and 400 are described with reference to the systems 100, and 200, as described above, although other models, frameworks, systems and environments may implement these processes.

FIG. 3 is a flow diagram of an example process 300 that includes reducing the latency associated with threat detection in a mobile network according to some implementations. The process 300 may be performed by one or more computing devices, such as the computing devices described with regard to FIGS. 1-2.

At 302, data is received from a first computing device 108A. As discussed above, the data 118 may be received at a network 102 associated with a wireless service provider and may be directed to a second computing device 108B that is associated with a device number. For example, a first computing device 108A may be sending data to a subscriber of the wireless service provider.

At 304, a copy of the data 118' that is received at the network 102 is provided to a threat detection component. In some examples, the threat detection is not performed at the gateway 116, and instead the threat detection component is executed by one or more of the service nodes 106. As discussed above, as data 118 is received at the network, a copy of the data 118' is made and provided to a threat detection node 106C that executes the threat detection component separately and independently from the delivery of the data 118 to the computing device 108B. In this way, the received data 118 is delivered to the second computing device 108B without introducing the latency associated with performing threat detection. For instance, performing the threat detection at the gateway 116 may introduce unwanted latency. As such, the time it takes for the threat detection node 106C to analyze the copy of the data 118' and detect possible threats to the network 102 does not impact the delivery of the data 118 to the computing device 108B. As such, the gateway 116 does not spend resources detecting threats.

At 306, the data 118 is delivered to the second computing device. According to some examples, the data 118 that is initially received by the network is passed to the second computing device 108B without first being inspected by the threat detection node 106C. As discussed above, a copy of the data 118' can be inspected for possible threats as the data 118 is delivered to the second computing device 108B.

At 308, data is received from the threat detection node 106C indicating that a possible threat to the network is detected. As discussed above, the threat detection component 232 inspects the copy of the data 118' (instead of inspecting the data that is received at the network). When the threat is detected, the threat detection node 106C can provide a signal to one or more computing devices indicating the possible threat. For example, when a possible threat is detected, the threat detection component 232 may instruct a computing device to hold data from the first computing device 108A until the threat detection component 232 has completed further threat-detection analysis. In some instances, after further analysis, the threat detection component 232 may determine that an actual threat exists, whereas in other instances, the threat detection component 232 may determine that no threat exists. When no actual threat is detected, the threat detection component 232 may instruct the computing device holding the data to release the held data. In other examples, the threat detection component 232 provides an indication of the possible threat to one or more computing devices. For example, the threat detection component may signal the second computing device 108B that a possible threat is detected. In other examples, the threat detection component 232 sends a notification to the PCRF service node 106N, or some other component in the network (e.g., the gateway 116) indicating that a threat is detected.

At 310, a threat detection action is performed. As discussed above, the threat detection action can be based on one or more policies of the network. As discussed in more detail below with regard to FIG. 4, the threat detection action can involve changing an available bandwidth to the second computing device (e.g., reducing the rate at which packets are delivered), terminating the connection to the second computing device, and/or performing some other action. As discussed briefly above, in some examples, data received after a possible threat is detected may be held, and not be delivered to the second computing device 108B, until the threat detection node 106C determines that the possible threat is not an actual threat. For example, the threat detection node 106C can identify that a possible threat exists, but after further examination, the threat detection node 106C can determine that an actual threat does not exist.

FIG. 4 is a flow diagram of an example process 400 that includes causing a threat detection to be performed according to some implementations. The process 400 may be performed by one or more computing devices, such as the computing devices described with regard to FIGS. 1-2.

At 402, one or more policies associated with the network 102 of the wireless service provider are accessed. As discussed above, in some configurations, the PCRF service node 106N accesses the one or more policies to identify the threat detection action to perform. The policies may be stored within a data store associated with the one or more service nodes 106 and/or at some other location.

At 404, the threat detection action to perform is identified. As discussed above, the threat detection action may indicate to adjust the data rate, change a prioritization of the delivery of data 118 received from the computing device 108A, prevent data from being delivered that is received from the computing device, the sending computing device 108A can be identified as a possible threat (e.g., a "suspicious" device), the sending computing device 108A quarantined such that the device can not send data to other devices within the network, and the like.

At 406, a copy of the data 118' is provided to the network component to perform the threat detection. As discussed above, in some configurations, the PCRF service node 106N notifies the gateway 116 and/or some other component to adjust the flow of traffic within the network. As subsequent data is received, the threat detection node 106C can continue to examine the subsequent data and, if determined, provide an update to the PCRF node 106N. For instance, the threat may no longer exist, the threat is escalated, and the like. The gateway 116 can continue to apply the last received instructions until updated to perform some other adjustment to the data delivered to the computing device 108B.

The various techniques described above are assumed in the given examples to be implemented in the general context of computer-executable instructions or software, such as program components, that are stored in computer-readable storage and executed by the processor(s) of one or more computers or other devices such as those illustrated in the figures. Generally, program components include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method performed by one or more processors configured with specific instructions, the computer-implemented method comprising:
   receiving, at a network affiliated with a wireless service provider, first data from a first computing device, wherein the network is a 5G network; delivering the first data to a second computing device; providing a copy of the first data to a third computing device located within the network; receiving an indication, from the third computing device, that the copy of the first data represents a threat to the network;
   receiving second data from the first computing device to deliver to the second computing device; and
   causing a threat detection action to be performed, wherein the threat detection action modifies a communication of the second data from the first computing device to the second computing device.

2. The computer-implemented method of claim 1, further comprising accessing one or more policies associated with the wireless service provider to identify the threat detection action to perform.

3. The computer-implemented method of claim 1, wherein causing the threat detection action to be performed comprises changing a data rate associated with delivering the second data to the second computing device.

4. The computer-implemented method of claim 1, wherein causing the threat detection action to be performed comprises preventing at least a portion of the second data from being delivered to the second computing device.

5. The computer-implemented method of claim 1, further comprising sending third data to a Policy and Charging Rules Function (PCRF) node, wherein the third data includes data associated with the possible threat.

6. The computer-implemented method of claim 5, further comprising making the copy of the first data during a time the first data is delivered to the second computing device.

7. The computer-implemented method of claim 1, wherein causing the threat detection action to be performed comprises instructing a gateway of the network to modify a data rate associated with a connection to the second computing device.

8. A non-transitory computer-readable media storing computer-executable instructions that, when executed, cause one or more processors of a computing device to perform acts comprising: receiving, at a network affiliated with a wireless service provider, data from a first computing device; delivering the data to a second computing device; providing a copy of the data to a third computing device that is configured to perform threat detection; receiving an indication, from the third computing device, that a threat to the network is detected; receiving second data from the first computing device to deliver to the second computing device; and causing a threat detection action to be performed, wherein the threat detection action modifies a communication of the second data.

9. The non-transitory computer-readable media of claim 8, wherein the acts further comprise accessing one or more policies associated with the wireless service provider to identify the threat detection action to perform.

10. The non-transitory computer-readable media of claim 8, wherein causing the threat detection action to be performed comprises changing a data rate associated with a connection between the first computing device and the second computing device.

11. The non-transitory computer-readable media of claim 8, wherein causing the threat detection action to be performed comprises preventing at least a portion of the second data from being delivered to the second computing device.

12. The non-transitory computer-readable media of claim 8, further comprising sending third data to a Policy and Charging Rules Function (PCRF) node, wherein the third data includes data associated with the possible threat.

13. The non-transitory computer-readable media of claim 8, wherein causing the threat detection action to be performed comprises instructing a gateway to modify a data rate associated with a connection to the second computing device.

14. The non-transitory computer-readable media of claim 8, further comprising making a copy of the data during a time the data is delivered to the second computing device.

15. A system comprising: one or more processors; and one or more memories storing instructions that, when executed by the one or more processors, perform acts including: receiving, at a network affiliated with a wireless service provider, data from a first computing device; delivering the data to a second computing device; providing a copy of the data to a third computing device located within the network; receiving an indication, from the third computing device, that a threat to the network is detected; receiving second data from the first computing device to deliver to the second computing device; and causing a threat detection action to be performed, wherein the threat detection action modifies a communication of the second data.

16. The system of claim 15, further comprising accessing one or more policies associated with the wireless service provider to identify the threat detection action to perform.

17. The system of claim 15, wherein causing the threat detection action to be performed comprises changing a data rate associated with delivery of the second data.

18. The system of claim 15, wherein causing the threat detection action to be performed comprises preventing at least a portion of the second data from being delivered to the second computing device.

19. The system of claim 15, further comprising sending third data to a Policy and Charging Rules Function (PCRF) node, wherein the third data includes data associated with the possible threat.

20. The system of claim 15, wherein causing the threat detection action to be performed comprises instructing a gateway to modify a data rate associated with a connection to the second computing device.

* * * * *